Dec. 8, 1942.    J. M. MILAN    2,304,368
VEHICLE BRAKE
Filed Nov. 6, 1939    2 Sheets-Sheet 1
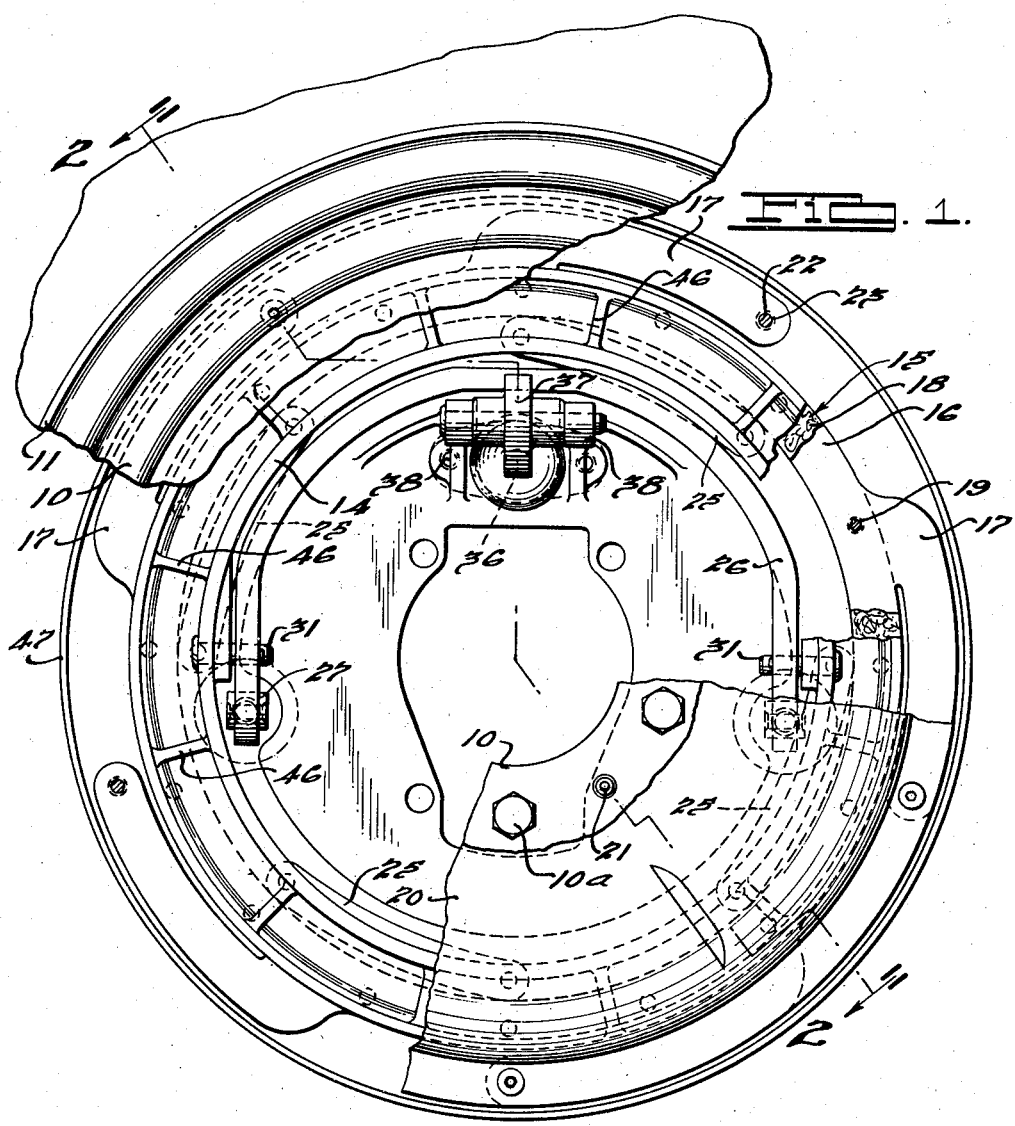
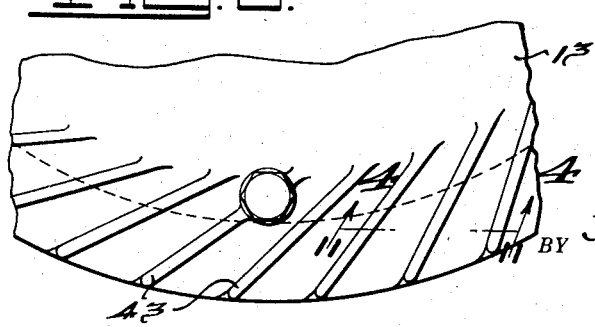
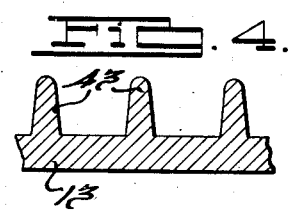
INVENTOR
Joseph M. Milan.
Dike, Calver & Gray
ATTORNEYS.

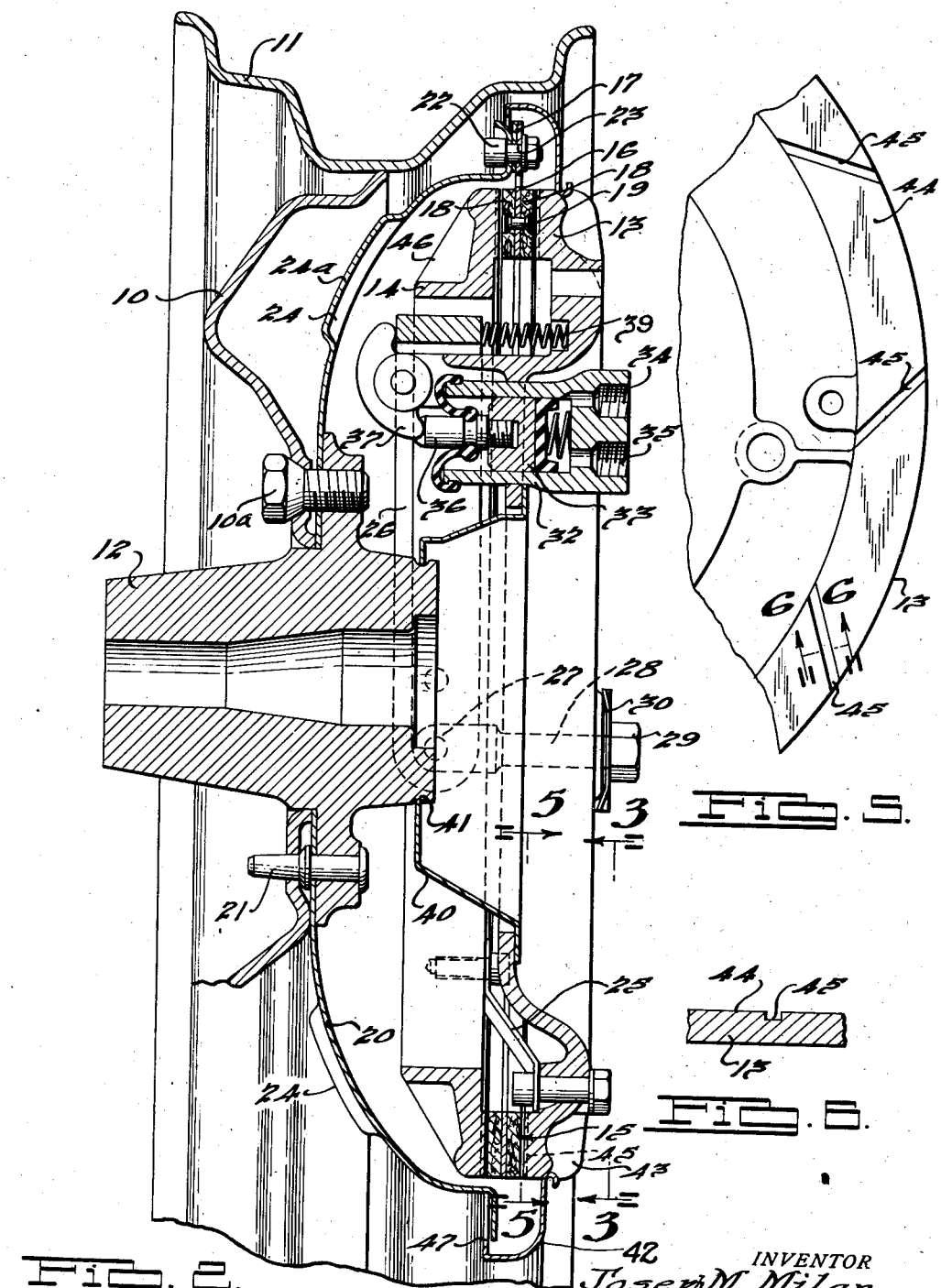

Patented Dec. 8, 1942

2,304,368

UNITED STATES PATENT OFFICE 2,304,368

VEHICLE BRAKE

Joseph M. Milan, Highland Park, Mich.

Application November 6, 1939, Serial No. 302,967

10 Claims. (Cl. 188—72)

The present invention relates to a vehicle brake and particularly to that class of such brakes commonly referred to as disk brakes.

It is an object of the present invention to provide an improved vehicle brake of the disk type in which the braking elements are air cooled.

A further object of the invention is to provide a vehicle brake of the disk type in which the friction disk is resiliently suspended between the movable pressure plate and the fixed backing plate.

Another object of the invention is to provide a vehicle brake of the disk type which is simplified in construction, readily serviced and adjusted in use, positive in operation and which has a relatively long operating service life with the minimum of required adjustments.

This application is related generally to the same subject matter as in my application for Vehicle brake, Serial No. 302,966, filed Nov. 6, 1939, now United States Patent No. 2,280,599, April 21, 1942.

Other objects and advantages of this invention will appear in the following description and appended claims, reference being had to the accompanying drawings forming a part of this specification, wherein like reference characters designate corresponding parts in the several views.

A vehicle brake embodying the present invention is shown by way of example in the accompanying drawings, in which Fig. 1 is an elevation with parts broken away of a brake embodying the present invention showing a fragmentary elevation of a portion of the vehicle wheel;

Fig. 2 is an enlarged section taken substantially on the staggered section line 2—2 of Fig. 1 in the direction of the arrows;

Fig. 3 is a fragmentary elevation taken substantially from the line 3—3 of Fig. 2 looking in the direction of the arrows;

Fig. 4 is a fragmentary section taken substantially on the line 4—4 of Fig. 3 in the direction of the arrows;

Fig. 5 is a fragmentary elevation taken substantially from the line 5—5 of Fig. 2 looking in the direction of the arrows; and Fig. 6 is a fragmentary section taken substantially on the line 6—6 of Fig. 5 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

A disk brake embodying the present invention is adapted for use on the wheels or other rotating parts of any desired type of vehicle. In the embodiment shown in the accompanying drawings the brake is of a type constructed for use on the front wheels of an automobile. It is to be understood, however, that the invention herein disclosed is not to be thereby limited to such use since changes within the purview of a mechanic skilled in the art may be readily made in the structural features of the brake which are required to mount it in position for any desired use, it being understood that the mechanical operative features of the brake will be substantially unchanged in the various uses to which the brake may be put, the changes required to adapt it to particular uses being chiefly in connection with the method of mounting the backing plate and the brake on the part with which they are to be used. In this connection it is to be observed that the brake consists essentially of four elements,—the backing plate which is secured to a non-rotating part, the pressure plate mounted on the backing plate but movable relative thereto, the friction disk suspended between the adjacent faces of the backing plate and the pressure plate, and the brake applying means carried by the backing plate and operable to move the pressure plate toward the backing plate and into braking engagement with the friction disk carried by the rotating part. Thus it will be seen that the brake may be applied to any rotating part and that while the brake is particularly designed for use on the wheels of wheeled vehicles, it may likewise be applied to the general class of shaft brakes.

A brake embodying the present invention illustrated in the accompanying drawings, with particular reference to Figs. 1 and 2, is shown as applied to the wheel 10 of a vehicle. The wheel 10 carries the rim 11 and is secured to a hub 12 as by the studs 10a. The hub 12 is mounted in this instance for rotation on a stub axle which is not shown in the drawings but which in the present instance is the stub axle attached to the conventional steering spindles used on the front wheels of an automobile.

The brake of the present invention consists of the backing plate 13, which is mounted on a non-rotating part of the vehicle structure, as for example by attachment to a bracket carried on the steering spindle (not shown). The pressure plate 14 is mounted on the backing plate 13 and is movable relative thereto both in a direction substantially at right angles to the face of the backing plate 13 and in a circumferential direction relative thereto as will be hereinafter more fully described.

The friction disk 15 is mounted for rotation with the hub 12 and is resiliently suspended between the backing plate 13 and the pressure plate 14. The friction disk 15 in the present embodiment consists of the metal plate 16 which is provided with a plurality of tangential arms 17 which, when mounted at their free ends to a supporting carrier, permit a resilient movement of the disk 15 due to the flexing of the arms 17. Disks of friction brake lining 18 are secured on opposite sides of the metal plate 16 as by rivets 19 which extend through the friction disks 18 and through the metal plate 16. The free ends of the tangential arms 17 and the friction disk 15 are secured by suitable securing means, as for example the nuts and bolts 22, to an air induction member 20 which is secured to the hub 12 by a plurality of studs 21. In order to provide for ready assembly and removal of the disk 15 from the air induction member 20, an opening 23 is located on each of the tangential arms at the point where the tangential arm is to be secured to the air induction member 20, and one of the bolts used for attaching the tangential arm to the periphery of the air induction member 20 extends through the opening 23 on each of the tangential arms 17.

The air induction member 20 is provided with a plurality of air induction ports 24. Upon rotation of the hub 12 and the air induction member 20, air is scooped into the brake by the action of the air scoops 24a provided adjacent each of the ports 24.

The pressure plate 14 is held in spaced relation to the backing plate 13 and the friction disk 15 by a plurality of spring strap members 25 which resiliently oppose any decrease in spacing between the adjacent faces of the pressure plate 14 and the backing plate 13. Decrease in spacing of the pressure plate 14 relative to the backing plate 13 is required for application of the brake and is accomplished by the brake applying mechanism which may be actuated in any desired manner, that is, either by mechanical means or by hydraulically actuated means. The brake applying mechanism in the present embodiment consists of a yoke member 26 which is pivotally mounted on adjustable pivot brackets 27 which are carried on the backing plate 13. Each of the adjustable pivot brackets has an extending shank 28 which is screw threaded on its end to provide for screw-threaded engagement with an adjusting nut 29 for the purpose of varying the position of the brackets 27 relative to the backing plate 13. The adjusting nut 29 is held in the adjusted position by contact with the locking washer 30 which is here shown as of the star type which provides a ready index to the amount of adjustment given to each of the adjustable pivot brackets.

The yoke 26 contacts a plurality of pivot pins or studs 31 which are secured to the pressure plate 14 so that as the top portion of the yoke 26 is moved toward the backing plate 13, either by mechanically actuated or hydraulically actuated means, a pressure is exerted on the pivot pins or studs 31 and the pressure plate 14 is moved in the direction of the backing plate 13 and into direct engagement with the adjacent face of the friction lining 18 on the rotating friction member 15. Upon contact with the friction lining 18, the pressure plate 14 is allowed to move circumferentially a slight distance due to the flexing of the spring strap members 25. At the same time the pressure plate 14 is caused to continue its movement toward the backing plate 13. The slight circumferential movement insures a smoother operating brake as the slight movement tends to prevent a sudden locking of the rotating part between the stationary backing plate 13 and the non-rotating pressure plate 14.

The movement of the yoke 26 may be accomplished by any suitable type of brake operating means, such for example as a hydraulic brake operating means here shown. It is to be understood, however, that instead of the hydraulically actuated means here shown and hereinafter to be described, that any type of desired mechanical connection may be made.

The hydraulic brake actuating mechanism here shown comprises the hydraulic cylinder 32 which is mounted in the backing plate 13 and a piston 33 which is movable in the cylinder 32 by the hydraulic fluid supplied through the hydraulic system. The hydraulic fluid is supplied to and withdrawn from the interior of the cylinder 33 through the inlet port 34. The port 35 provides for bleeding the lines and cylinder if desired.

A stud 36, in the present instance carried on the piston 33, moves with the piston 33 and as the piston 33 is moved toward the yoke 26, the stud 36 contacts one arm of a pivoted lever 37 which has its other arm in contact with the surface of the yoke 26 and causes it to pivot about a pivotal shaft secured in the brackets 38 which are formed on the face of the backing plate 13. This causes the yoke 26 to move toward the backing plate 13 and in so doing to compress the spring 39. As this movement continues, the yoke 26 contacts the studs or pins 31 and causes the pressure plate 14 to move toward the backing plate 13 and into braking engagement with the friction lining 18 on the rotating friction member 15.

In order to close the interior of the brake against the entrance of foreign matter such, for example, as mud, water, grease, etc., a stamped plate 40 is secured to the backing plate 13 and extends to a point adjacent a groove 41 provided in the hub 12 which, while substantially sealing the space between the hub 12 and the rim of the backing plate 13, permits rotation of the hub 12 relative to the backing plate 13. An annular ring 42 is removably secured to the backing plate 13 and extends to a point adjacent to but spaced from the periphery of the air induction member 20. This construction, while permitting the circulation of air through the brake, effectually protects the brake against the entrance of foreign materials therein.

The exterior surface of the backing plate 13, as shown in Figs. 3 and 4, is provided with spaced heat radiating ribs 43 which extend on lines substantially tangential to the circumference of the backing plate 13 and which are arranged to be washed by air streams when the vehicle is in motion. The ribs 43 are so designed as to cause a turbulence in the air stream and to effect a complete washing of the ribs by such air streams for the purpose of effecting the ready dissipation of heat by radiation from the ribs 43.

The braking surface of the backing plate 13 is divided into a plurality of separated sectors 44, as shown in Figs. 5 and 6, each sector 44 being divided from an adjacent sector by means of grooves or ducts 45 which are designed to permit the air circulation between the friction lining 18 of the friction disk 15 adjacent the backing plate 13, and also to provide for the discharge of any fluids which may become entrapped in the brake and which might prevent effective frictional braking contact between the backing plate 13 and the adjacent friction lining on the friction disk 15.

In order to assure cooling of the pressure plate 14, a plurality of heat radiating ribs 46, so disposed as to be washed with air which is drawn into the brake by the air induction member 20, are provided on its surface opposite the points of contact between the pressure plate 14 and the friction lining 18.

As will be seen from the foregoing description, the present invention provides a construction in which the air induction member 20 upon rotation of the wheel or other rotating part to which it may be attached, draws air into the interior of the brake chamber and thoroughly washes the interior portions of the brake with such air. The air is discharged through the circumferential port 41 which is provided between the periphery of the member 20 and the spaced lip of the annular ring 42. At the same time the heat radiating ribs 43 are in contact with air streams which are generated by the vehicle in motion and a turbulence is given to the air streams by the position and direction of the ribs 43. The direction of the ribs 43 and the turbulence caused in the air streams tend to create a reduced pressure area in the region adjacent the ports 41 and this, together with the positive air pressures built up inside the brake by the operation of the air induction member 20, causes a ready and rapid flow of air through the interior of the brake. Thus the heat is carried out of the brake by the convection of the air currents flowing through the interior of the brake, as well as by the radiation of the heat from the ribs 43 on the backing plate 13.

The construction of the brake as herein disclosed likewise permits the use of a backing plate 13 which is much lighter in weight than in similar types of brakes previously suggested. The use of relatively light-weight backing plates 13 has in many instances resulted in the construction of inoperative brakes since the method of applying the braking pressures has been such as to warp the backing plate similar to the backing plate 13 and cause it to be thrown out of alignment with the friction element. This disadvantage is overcome in the present invention by mounting the brake cylinder 32 into the backing plate 13 and applying the force to the rocking lever 37 and to the yoke member 26 in such a way that as the pressure plate 14 is moved toward the backing plate 13, the forces are distributed through the bracket members 27 and the adjusting nut 29 to other portions of the backing plate 13 and thus a more uniform distribution of the braking forces is accomplished. This distribution of the braking forces eliminates warping of the backing plate 13 which is frequently found in prior constructions in which the force is transmitted only to segregated areas of the backing plate 13. Another factor causing warping of backing plates in other designs of brakes has been the failure to rapidly dissipate the heat created in such plates by the operation of the brake. In a brake embodying the present invention, as has previously been pointed out, this rapid dissipation of the generated heat is accomplished by the circulation of air through the brake chamber, as well as by the provision of heat radiating fins which form a part of the backing plate 13.

In the design of vehicle brakes of the disk type it has frequently been difficult to secure alignment of the friction disk between the pressure plate and the backing plate and to maintain this alignment during operation of the brake. In the present invention this problem is solved by the use of the resilient tangential arms 17 which are so designed as to flex both during movement of the friction disk 15 toward the backing plate 13 upon actuation of the brake, and also upon rotation of the friction disk 15 when the brake is not applied. The rotation of the hub 12 and the air induction member 20 causes rotation of the friction disk 15 and due to the natural tendency of a rotating part to seek its own center during such rotation, the resilient arms 17 are flexed in such a manner that the friction disk 15 is allowed to find its own weight center and thus to rotate in a plane which is determined by the structure and weight distribution of the friction disk 15.

Thus it will be seen that a brake embodying the present invention possesses all of the advantages which are commonly associated with brakes of the disk type, namely, increased braking surface area for a brake of a given diameter over the area available in a conventional shoe and drum type of brake, and the ready adjustment and uniform application of the braking pressures over the braking surface areas. In addition, the disk brake of the present invention permits the use of a relatively light backing plate and provides for the resilient mounting of the friction disk between the pressure plate and the backing plate. The brake is readily cooled and is of a simplified construction which may be readily serviced and adjusted. The brake is also positive in its operation and upon test has been shown to possess a relatively long operating service life with the minimum of required adjustments.

I claim:

1. A brake mechanism having a stationary backing plate, a pressure plate resiliently mounted on and movable relative to said backing plate and a resiliently mounted rotatable friction disk disposed between said backing plate and said pressure plate, said disk being drivingly connected to the vehicle wheel, brake operating means for moving said pressure plate toward said backing plate to engage said friction disk between said pressure plate and said backing plate, and means for driving said rotatable disk and for cooling said brake and comprising a rotatable air induction member driven from the vehicle hub.

2. A vehicle brake mechanism having a backing plate secured to the vehicle, a pressure plate resiliently carried by said backing plate and movable relative thereto, a resiliently mounted rotatable friction member drivingly connected with the vehicle hub and suspended between said backing plate and said pressure plate, brake operating means controllable from the vehicle and adapted to move said pressure plate in the direction of said backing plate to engage the braking surfaces of said friction member between said pressure plate and said backing plate, and means for dissipating the heat created in said brake during the engagement of said pressure plate, friction disk and backing plate, and comprising heat radiating fins formed on said backing plate and a rotatable air induction member driven from the vehicle hub whereby when the vehicle is in motion one air stream is driven through said brake and separate air streams wash said heat radiating fins.

3. A brake mechanism having braking means comprising a stationary backing plate, a pressure plate movable relative to said backing plate and a rotatable friction disk comprising an annular supporting plate having friction disks secured to opposite sides thereof and having a plurality of spaced tangential resilient arms formed on the circumference thereof whereby said disk is resiliently suspended between said backing plate and said pressure plate, brake operating means for moving said pressure plate toward said backing plate to engage said friction disk between said pressure plate and said backing plate to accomplish braking action, and means for driving said rotatable disk and for cooling said backing plate, pressure plate and friction disk independently of said braking means and of said brake operating means and comprising a rotatable air induction member driven from the vehicle hub, said member being connected to said resilient arms for supporting and driving said friction disk.

4. A brake mechanism having a stationary backing plate, a pressure plate resiliently mounted on said backing plate for limited movement axially and circumferentially thereof, a rotatable friction disk resiliently suspended between said backing plate and said pressure plate, brake operating means for moving said pressure plate toward said backing plate to engage said friction disk between said pressure plate and said backing plate, and means for driving said rotatable disk and for cooling said brake and comprising a rotatable air induction member driven from the vehicle hub and connected in driving relation with said friction disk.

5. A brake mechanism having a stationary backing plate, a pressure plate resiliently mounted on said backing plate for limited movement axially and circumferentially thereof, an annular rotatable friction member drivingly connected with the vehicle wheel hub and suspended between said backing plate and said pressure plate, brake operating means controllable from the vehicle and adapted to move said pressure plate in the direction of said backing plate to engage the braking surfaces of said friction member between said pressure plate and said backing plate, and means for dissipating the heat created in said brake during the engagement of said pressure plate, friction disk and backing plate, and comprising heat radiating fins formed on said backing plate and a rotatable air induction member driven from the vehicle hub whereby when the vehicle is in motion one air stream is driven through said brake and separate air streams wash said heat radiating fins.

6. A brake mechanism having a stationary backing plate, a pressure plate resiliently mounted on said backing plate for limited movement axially and circumferentially thereof, a rotatable friction disk comprising an annular supporting plate having friction disks secured to opposite sides thereof and having a plurality of spaced tangential resilient arms formed on the circumference thereof whereby said disk is resiliently suspended between said backing plate and said pressure plate, brake operating means for moving said pressure plate toward said backing plate to engage said friction disk between said pressure plate and said backing plate, and means for driving said rotatable disk and for cooling said brake and comprising a rotatable air induction member driven from the vehicle hub and connected in driving relation with said friction disk.

7. A brake mechanism having a stationary backing plate, a pressure plate resiliently mounted on said backing plate for limited movement axially and circumferentially thereof, a rotatable friction disk comprising an annular supporting plate having friction disks secured to opposite sides thereof and having a plurality of spaced tangential resilient arms formed on the circumference thereof whereby said disk is resiliently suspended between said backing plate and said pressure plate, brake operating means controllable from the vehicle and adapted to move said pressure plate in the direction of said backing plate to engage the braking surfaces of said friction member between said pressure plate and said backing plate, and means for dissipating the heat created in said brake during the engagement of said pressure plate, friction disk and backing plate, and comprising heat radiating fins formed on said backing plate and a rotatable air induction member driven from the vehicle hub whereby when the vehicle is in motion one air stream is driven through said brake and separate air streams wash said heat radiating fins.

8. A brake mechanism having a backing plate, a pressure plate mounted on and spaced from the backing plate for movement relative thereto, a rotatable friction disk resiliently suspended between the backing plate and the pressure plate, brake operating means for moving the pressure plate toward the backing plate to engage the friction disk between said plates, and means for driving said rotatable disk and for cooling the brake mechanism, said means including a rotatable air induction member driven from the vehicle hub and connected in driving relation with said friction disk.

9. A disk brake mechanism for a vehicle, which comprises a backing plate, a pressure plate movable toward said backing plate, a rotatable friction disk supported between said plates, brake operating means for moving said pressure plate toward said backing plate to engage the friction disk between said plates, and means for driving said friction disk and for cooling the brake mechanism, said means including a rotatable air induction member driven from the vehicle hub and connected in driving relation with the friction disk, said air induction member being provided with openings and air deflectors adjacent said openings for introducing air into the interior of the mechanism on rotation of the vehicle wheel.

10. A disk brake mechanism for a vehicle, which comprises a backing plate, a pressure plate movable toward said backing plate, a rotatable friction disk resiliently suspended between said plates, brake operating means for moving said pressure plate toward said backing plate to engage the friction disk between said plates, and means for driving said friction disk and for cooling the brake mechanism, said means comprising a substantially dish-shaped metallic plate having louvre-like openings providing impeller means for directing air into the interior of the mechanism on rotation of the vehicle wheel, said friction disk being connected to said dish-shaped plate and being driven and supported thereby.

JOSEPH M. MILAN.